Aug. 13, 1940.    J. J. JAKOSKY    2,211,125
METHOD AND APPARATUS FOR THE ELECTRICAL EXPLORATION OF THE SUBSURFACE
Filed July 5, 1939    2 Sheets-Sheet 1

Inventor
JOHN JAY JAKOSKY,
By Arthur P. Knight and
Alfred W. Knight
Attorneys

Aug. 13, 1940.   J. J. JAKOSKY   2,211,125
METHOD AND APPARATUS FOR THE ELECTRICAL EXPLORATION OF THE SUBSURFACE
Filed July 5, 1939   2 Sheets-Sheet 2
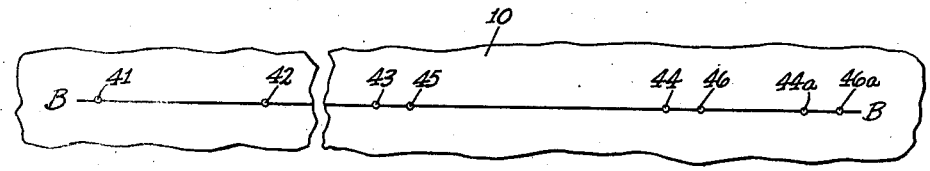
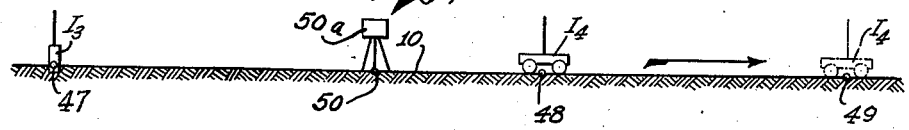
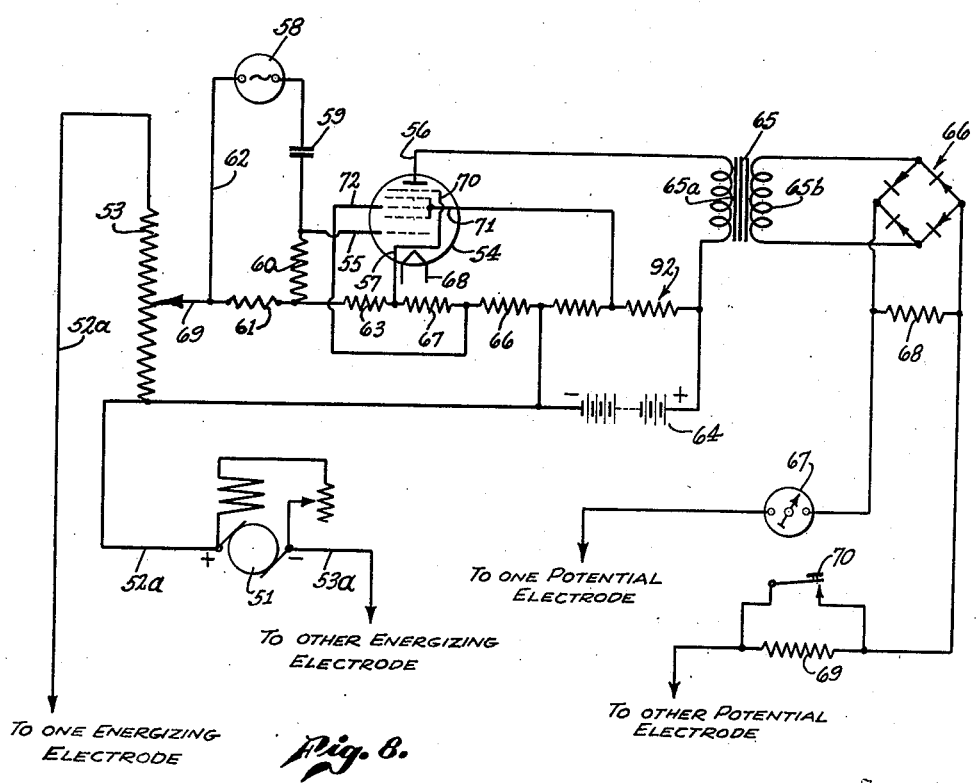
Inventor
JOHN JAY JAKOSKY,
By Arthur P. Knight and
Alfred W. Knight
Attorneys Patented Aug. 13, 1940

2,211,125

UNITED STATES PATENT OFFICE 2,211,125

METHOD AND APPARATUS FOR THE ELECTRICAL EXPLORATION OF THE SUBSURFACE

John Jay Jakosky, Los Angeles, Calif.

Application July 5, 1939, Serial No. 282,905

13 Claims. (Cl. 175—182)

This invention is directed to a method and apparatus for the electrical exploration of the subsurface and has as its general object the improvement in accuracy in the results obtained by substantially eliminating the effects of near-surface inhomogeneities from the measurements obtained in such surveys.

Another important object of the invention is to increase the speed of such surveys by maintaining one energizing electrode in a fixed position, and, when potential electrodes are used, maintaining them in fixed positions also, so that only the other energizing electrode is moved during each series of measurements.

Another important object of the invention is to provide an improved apparatus for measuring the ratio between the energizing current and the potential difference created thereby between a pair of spaced points on the earth's surface.

According to general electrical surveying practice an electric current is passed through the earth between a pair of spaced current or energizing electrodes which are electrically connected to the earth, so as to create, at a position on the earth's surface having a known spacial relationship with respect to the energizing electrodes and spaced therefrom, a quantity which is dependent upon the path of flow of the current and the electrical characteristics of the earth traversed by the current. Measurements are then taken during the flow of such current which involve the value of the created quantity, and the nature and characteristics of the subsurface are determined from the measurement so obtained. Measurements are generally taken between potential electrodes for each of a plurality of different spacings of the energizing electrodes, and it is customary to change the spacing between the current or energizing electrodes by moving both of the electrodes to different positions. It is also customary to change the spacing between the potential electrodes by moving one or both of these electrodes when the current electrodes are moved. I have found that the effects of the near surface inhomogeneities directly adjacent the electrodes produce the greatest variations in the measurements. Hence, when all of the electrodes are moved, it is generally impossible to determine the positions of such near-surface anomalies so that they may be separated from the desired anomalies produced by deeper-lying inhomogeneities.

As a typical example of a procedure according to my invention, I conduct a first survey to determine variations in the subsurface at different depths by passing a controlled electric current through the earth between a first energizing electrode connected to the earth at a substantially fixed position and a second energizing electrode spaced from the first electrode, moving the second electrode to a plurality of different positions along an interval of distance on the earth's surface, and taking a series of measurements which are indicative of variations in a quantity created at a fixed position on the earth's surface by the flow of said current through the earth as the second electrode is moved to the different positions. I then conduct a second of such surveys by passing a controlled electric current through the earth between a first electrode connected to the earth at a substantially fixed position which is preferably different from the fixed position of the first electrode of the first survey, and a second electrode spaced from the first electrode of the second survey, moving the second electrode of the second survey to a plurality of different positions along an interval of distance on the earth's surface partially overlapping and partially extending beyond one end of the interval along which the second electrode of the first survey was moved, and taking a series of measurements which are indicative of variations in a quantity created at a fixed position on the earth's surface by the flow of said current through the earth as the second electrode of the second survey is moved to the different positions. A plurality of the measurements in the second survey are taken when the second electrode of the second survey is located at the same positions at which the second electrode of the first survey was located while taking a plurality of the measurements in the first survey. These same operations may be repeated for any desired number of surveys.

I have found that as one of the energizing electrodes is moved successively to different positions, the near-surface inhomogeneities adjacent each of these positions will be reflected in the measurements obtained. By obtaining a second series of measurements with an energizing electrode again moved to successively different positions, at least a portion of such positions being on an interval which overlaps the intervals over which the energizing electrode was moved in the prior series of measurements and more preferably at the same positions occupied by the moving energizing electrodes in the prior series of measurements in the overlapping intervals, the measurements obtained in one series may be compared with the measurements obtained in the overlapping interval of the other series and corrected for errors due to near-surface effects. This is accomplished because the effects of the near-surface adjacent the energizing electrode which is moved will show up when the moving energizing electrode is in substantially the same position on the earth in both surveys practically irrespective of the distance between the two energizing electrodes in either survey.

In practice, curves may be drawn from the data received in each series of measurements, by plotting, for example, the apparent resistivity as obtained from the measurements, against the position of the moving energizing electrode. By superposing two or more such curves representative of two or more successive series of measurements, the near-surface effects can be identified by the fact that certain well-defined irregularities in the curves, usually extending over short distances along each curve, will appear at substantially the same position of the moving electrode on each curve.

In any electrical survey, when a measurement is taken when the earth is energized by an electric current, the final interpretation of the measurement depends not only upon the magnitude of the effect created by the energizing current, but also upon the magnitude or some other characteristic of the energizing current. Hence, it will be understood that throughout the specification and claims where mention is made of measurements involving the created quantity or of measurements of a quantity dependent upon the path of flow of the energizing current and the electrical characteristics of the earth traversed by the current, it will also be understood that the necessary information regarding the energizing current will be obtained. Such information regarding the current may be obtained by directly measuring the current or by controlling its magnitude as by keeping it substantially constant, for example, or by directly measuring the ratio between the energizing current and the potential difference or other created quantity. It is to be understood also that measurements involving the created quantity are meant to include measurements of the energizing current required to produce a given value of the created quantity. Measurements of this general type are disclosed and claimed in my copending application Serial No. 177,573, filed December 1, 1937.

The above and further features of my invention will be better understood when described in conjunction with the accompanying drawings, in which:

Fig. 6 is a diagrammatic plan view illustrating an alternative procedure according to my invention;

Fig. 7 is a diagrammatic sectional elevation illustrating a modified arrangement according to my invention; and Fig. 8 is a wiring diagram of a preferred form of measuring apparatus according to my invention.

Figure 1:
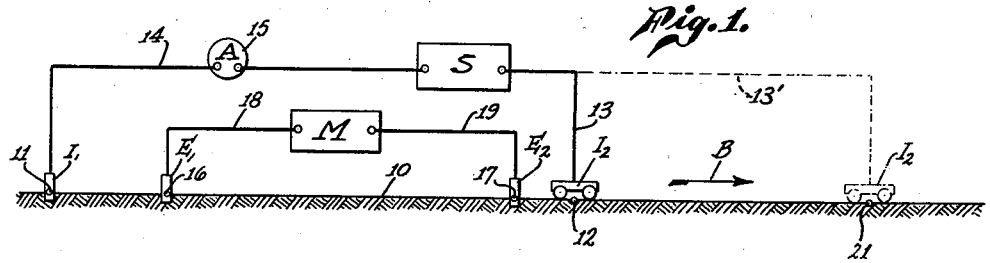
Fig. 1 is a diagrammatic vertical section of the earth illustrating an apparatus arrangement according to my invention and a wiring diagram therefor.
Figure 2:
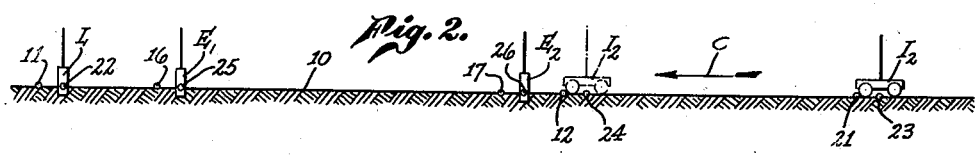
Figs. 2 and 3 illustrate successive steps in carrying out the method of my invention with the apparatus illustrated in Fig. 1.
Figure 3:
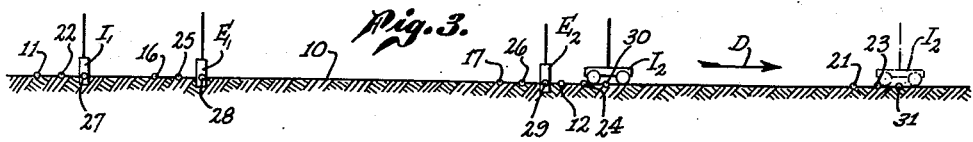
Figure 4:
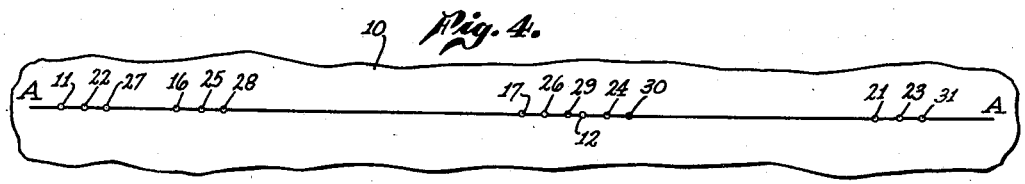
Fig. 4 is a diagrammatic plan view of the earth showing the position occupied by the electrodes illustrated in Figs. 1 to 3.

Referring to Figs. 1 to 4 of the drawings and particularly to Figs. 1 and 4, energizing electrodes $I_1$ and $I_2$ are shown connected to the earth 10 at two spaced points 11 and 12, respectively, defining a line A—A passing through said points and also through said electrodes. The electrode $I_2$ may comprise a mobile electrode as disclosed and claimed in my Patent No. 2,105,247 or it may comprise one or more common stake electrodes of any of the types known in the art. A source of current S is shown with one terminal connected through an insulated conductor 13 to the mobile electrode $I_2$ and with another terminal connected through an insulated conductor 14 to the electrode $I_1$. An ammeter 15, either indicating or recording, is shown connected in conductor 14 so that a record of the current passed through the earth between the electrodes $I_1$ and $I_2$ may be obtained.

The current source S may comprise any controllable source of unidirectional current, either pulsating or continuous alternating current of either high or low frequency, commutated direct current, or pulsating current, or any other suitable source of current. We may assume for the purposes of description, however, that the source S comprises a source of direct current such as a storage battery or a direct current generator.

Potential electrodes $E_1$ and $E_2$ are shown connected to the earth at two spaced points 16 and 17, respectively, which points, for the purposes of simplifying this description, are shown substantially on the line A—A. A measuring means M, either recording or indicating, is shown connected between the electrodes $E_1$ and $E_2$ through suitably insulated conductors 18 and 19. The measuring means M may comprise a conventional potentiometer for measuring the potential difference between the electrodes $E_1$ and $E_2$, or it may comprise other suitable potential-responsive measuring means such as a means for measuring the ratio between the energizing current and the potential created between the potential electrodes, as will be described more fully hereinafter, or, as one example when alternating current is used, it may comprise an apparatus of the type shown in my Patent No. 2,038,046 for measuring the phase angle between the current in the energizing circuit and the potential difference between the potential electrodes.

When either of the last two types of apparatus is utilized a connection between the measuring means M and the energizing circuit is also required, as brought out more fully hereinafter. We may assume for purposes of this description, however, that the measuring means M comprises a recording potentiometer. Obviously the ammeter A and the measuring means M may comprise the moving elements of a recording oscillograph.

In accordance with one example of practice according to this invention, I may set the power source S in operation to energize the earth between the electrodes $I_1$ and $I_2$ and move the electrode $I_2$ to successively different positions substantially along the line A—A to successively vary the spacing between the energizing electrodes $I_1$ and $I_2$. The electrode $I_2$ may be moved over an interval of distance along this line between the point 12 and a point 21, for example, in the direction of arrow B. The electrode $I_2$ is shown in dotted lines to denote the end of its travel at point 21, and the conductor 13 connecting the electrode $I_2$ and the power source S is shown extended to the electrode $I_2$ and is designated by the dotted line 13'. The position of the energizing electrode $I_1$ and the positions of the electrodes $E_1$ and $E_2$ are maintained fixed and are the same for each of the successive positions of the electrode $I_2$. Measurements are obtained on the potential measuring means M involving the potential difference between the electrodes $E_1$ and $E_2$ with the current flow through the earth between the current electrodes through each of a plurality of different values of spacing between the energizing electrodes with the electrode $I_2$ in each of a plurality of positions substantially on the line A—A in the interval between the points 12 and 21. When a mobile electrode, or other comparable system with which continuous contact with the earth is maintained as the separation between the energizing electrodes is changed, is used for the electrode $I_2$, the measurements may be taken either continuously or intermittently; and when the electrode $I_2$ is a common stake electrode, measurements may be taken with this electrode driven into the ground at each of a plurality of positions in the interval between points 12 and 21. In either case the position of the electrode $I_2$ along the line A—A is recorded with the corresponding measurement. The positions of the moving energizing electrode may be determined by direct survey or by recording the movement of the electrode along with the electrical data as disclosed and claimed in my Patent No. 2,105,247. The series of measurements obtained when the electrode $I_2$ is moved along the interval between the points 12 and 21 may be considered as comprising one survey. The procedure described above is disclosed and claimed in my copending application Serial No. 172,009, filed October 30, 1937.

To obtain a second series of measurements comprising a second survey, the electrode $I_1$ may be moved to a second position spaced from the point 11, for example toward the electrode $I_2$ to the point 22, as illustrated in Figs. 2 and 4. I usually prefer to relocate the electrodes $E_1$ and $E_2$ by moving them the same distance and in the same direction along the line A—A as the electrode $I_1$ is moved. The electrodes $E_1$ and $E_2$ are shown occupying points 25 and 26, respectively, which are spaced from one another by the same distance as the points 16 and 17. The electrode $I_2$ is then moved along the line A—A over an interval of distance which is preferably of the same length as the interval between the points 12 and 21 and which is preferably displaced along the line A—A in the same direction and by the same distance as the electrode $I_1$ is displaced. This distance is represented by the distance between the points 11 and 22. Thus the electrode $I_2$ is moved along the line A—A over the interval of distance between the points 23 and 24, overlapping the interval defined by points 12 and 21 over the distance defined by the points 21 and 24, and partially extends beyond the interval between points 12 and 21 by a distance defined by points 21 and 23.

In this figure and in Figs. 3 and 4, the electrical connections between the various electrodes have been omitted in order to clarify the illustration and may be assumed to be the same as illustrated in Fig. 1.

A second series of comparable measurements is now obtained with the current flowing through the earth between the electrodes $I_1$ and $I_2$ through each of a plurality of different values in spacing between these electrodes as the electrode $I_2$ is moved to successively different positions over the interval between the points 23 and 24, and a plurality of the measurements in this series are obtained when one of the energizing electrodes is occupying the same positions occupied by one of the energizing electrodes when measurements were taken in the first series. This series of measurements is also obtained while maintaining the electrode $I_1$ and the electrodes $E_1$ and $E_2$ in fixed positions.

Any convenient procedure may be used for moving the electrode $I_2$ to different positions along the interval between the points 23 and 24, and when using a mobile electrode I find it most convenient to move the electrode in the direction of the arrow B, between the points 21 and 23 during the time the electrodes $I_1$, $E_1$, and $E_2$ are moved to their new positions, so that by the time the electrodes $I_1$ and $E_2$ are in position and the operators are ready to take measurements, the electrode $I_2$ is ready to travel in the reverse direction along the line A—A over the interval between the points 23 and 24 in the direction of the arrow C.

In Figs. 3 and 4 the electrodes $I_1$, $E_1$, and $E_2$ have been moved forward along the line A—A by an interval equal to the interval between the points 11 and 22 to occupy the points 27, 28 and 29, respectively. The interval over which the electrode $I_2$ is moved is also displaced along the line A—A by the same distance, and in this case the electrode $I_2$ moves over the interval between the points 30 and 31, preferably in the direction of the arrow D, since this electrode was nearer the point 30 at the completion of the series of measurements obtained in connection with Fig. 2. Hence, time is saved by moving from the point 30 to the point 31 in a direction of the arrow D. A series of measurements comprising a third survey is obtained by passing current through the earth between electrodes $I_1$ and $I_2$ as the electrode $I_2$ is moved to different positions along the interval between the points 30 and 31 and taking measurements involving the potential created between the electrodes $E_1$ and $E_2$.

It will be noted that the interval between the points 30 and 31 not only overlaps the interval between the points 23 and 24, but also overlaps a portion of the interval between points 12 and 21. Thus a part of the measurements in each of the series of measurements are obtained with the electrode $I_2$ occupying substantially the same positions. This procedure may be repeated for any desired or required number of times to secure information regarding the earth included within the path of current flow between the energizing electrodes.

As one specific example of an electrode arrangement which I have found advantageous in this type of survey, I may maintain the electrodes $I_1$ and $E_1$ at a distance of 5,000 feet from one another while maintaining the electrodes $E_1$ and $E_2$ at a distance of 15,000 feet from one another. The electrode $I_2$ may be moved along an interval of 12,500 feet, which interval is spaced from the electrode $E_2$ by a distance of 2,500 feet. The increment of movement of the entire electrode configuration as defined by the interval between the points 11 and 22 may be from 500 to 1,000 feet, for example.

Figure 5:
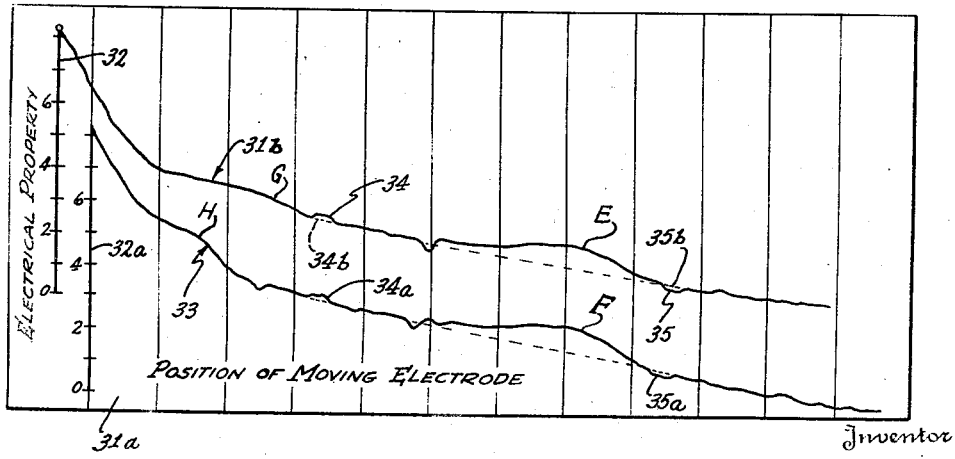
Fig. 5 illustrates curves of two series of measurements which are plotted so that they may be compared.

Referring to Fig. 5 a series of measurements obtained according to the procedure outlined in Fig. 1, for example, has been converted to values representative of an electrical property of the subsurface and has been plotted against the position of the moving electrode to give a curve $31b$ on curve sheet $31a$. The ordinates for this curve are given as empirical values on scale 32. A second curve 33 obtained according to the procedure described in connection with Fig. 2 is shown plotted to the same scale below the curve $31b$ with the ordinates therefor indicated on scale $32a$. It will be noted that certain well-defined variations, usually extending over short distances, which appear on the curve $31b$, such as the inflections 34 and 35, also appear on curve 33 when the moving energizing electrode is in a corresponding position as indicated by the inflections $34a$ and $35a$. Hence these inflections are due to the effects of the near-surface inhomogeneities in the neighborhood of the moving energizing electrode and are not due to inhomogeneities at relatively great depths. Thus the curve $31b$ may be assumed to be following its broader and more general trend through the portions 34 and 35 as indicated by the dotted lines $34b$ and $35b$. Without the second overlapping curve it would not necessarily be correct to replace the first curve with a smooth curve, since the variations may not be due to near-surface inhomogeneities. Longer inflections in the curves such as E and F may be due to extensive lateral near-surface effects or to deeper lying structural effects. However, since the two inflections appear for substantially the same positions of the moving energizing electrode they may be identified as near surface effects. Inflections G and H appear at different positions of the moving electrode and thus may be considered as being due to deeper structure. Numerous procedures may be followed for using the data so obtained and reference may be had to the publication "Geophysics," vol. 3, No. 2, March 1938, where the interpretation of the above and other types of geophysical data is discussed in greater detail.

Although it is preferable to move the potential electrodes to successively different positions for each successive series of measurements, it is not always necessary to do so. For example, in Fig. 6 potential electrodes may be located at the points 41 and 42 on line B—B; energizing electrodes may be located at the points 43 and 44. One series of measurements may be obtained with the respective electrodes fixedly located at the points 41, 42, and 43, while one of the energizing electrodes is moved between the points 44 and $44a$ for example. A second series of measurements may be obtained by leaving the potential electrodes at points 41 and 42, placing one of the energizing electrodes at point 45, and moving the other energizing electrode between the points 46 and $46a$, which interval overlaps the interval between points 44 and $44a$. This procedure may be repeated throughout any desired number of successive series of measurements.

It will be noted that in this illustration the potential electrodes are located at points which are removed in the same direction from both of the current electrodes. The same procedure may be employed with these potential electrodes as was described in connection with Figs. 1 to 4 in which the potential electrodes were located between the energizing electrodes. In this connection it may be stated that the position defined by the potential electrodes or other equivalent means used in the measurements involving the quantity created by the energizing current need not lie totally within or totally without the interval defined by a pair of energizing electrodes. Obviously the position may be located at any place on the earth's surface where variations in quantity created by variations in the energizing current are appreciable. Furthermore, it should be noted that it is not necessary to locate the potential electrodes on the line passing through the energizing electrodes and that either one of these electrodes may be located away from the line passing through the energizing electrodes. In every case, however, one of the energizing electrodes and the potential electrodes are maintained in fixed positions throughout the series of measurements.

In each of the examples given above, the position at which the created quantity involved in the measurements is obtained, is defined by a pair of potential electrodes. It will be appreciated that this position may be defined by more than two potential electrodes, for example by using a potential electrode arrangement as disclosed and claimed in my copending application Serial No. 144,467, filed May 24, 1937. It is not necessary for this position to be defined by potential electrodes and the position may be defined by the location of an apparatus responsive to the magnetic or electromagnetic field created by the flow of energizing current, which apparatus may be, for example, one of the types mentioned in my Patents Nos. 2,105,247 and 2,137,650.

Referring now to Fig. 7, energizing electrodes $I_3$ and $I_4$ are shown connected to the earth 10 at points 47 and 48, the electrode $I_2$ being moved between points 48 and 49 during a survey. The points 47, 48 and 49 may correspond to the points 11, 12 and 21 of Fig. 1 and the electrodes $I_3$ and $I_4$ may be connected to a suitable power source S in the same manner as the electrodes $I_1$ and $I_2$ as shown in Fig. 1. At the position defined by a point 50, located between the electrodes $I_3$ and $I_4$ for the purpose of example, is illustrated diagrammatically an apparatus $50a$ of the type above described responsive to the created magnetic or electromagnetic field. The survey may be carried out in exactly the same manner as described in connection with Figs. 1–3 with the position of the apparatus $50a$ being moved along the line of traverse by the same increments of movement as the potential electrodes $E_1$ and $E_2$. Or, a survey may be carried out as described in connection with Fig. 6, in which case the instrument $50a$ may be located at the point 50 or at some other point throughout several series of measurements.

It will be appreciated that although the electrode movements in each of the above described examples have been along straight lines, the advantages of this invention can still be realized even though the electrodes are not moved along straight lines, just as long as part of the measurements in each series of measurements are taken with a moving energizing electrode in the same positions.

Although for convenience in illustration and explanation the positions of the electrodes have been referred to as "points," or as defining points, it should be understood that the position defined by an ordinary stake electrode is actually an area and that the position defined by a mobile electrode may lie over a considerable area which is equivalent to the area represented by a plurality of stake electrodes connected to one another. Hence throughout the specification and in the appended claims where a single electrode is spoken of it will be understood that it will also include any equivalent earth contacting means such as defined above for example.

Referring to Fig. 8, I have shown an apparatus which is extremely useful for measuring the ratio between the current in the energizing circuit and the potential different which is created between a pair of potential electrodes by the flow of energizing current. Such ratio measurements are extremely desirable since they give measurements which may be quickly converted into resistivity values when proper correction is made for the electrode configuration and also because it is not necessary to measure both the current and the potential each time a measurement is taken, nor is it necessary to control the current as accurately as is required when current and potential are measured separately and simultaneously.

One difficulty which has prevented the taking of ratio measurements in direct current circuits from being practiced universally has been the complexity of the apparatus required to isolate the two circuits such as the current and potential circuits described herein to prevent any substantial interaction therebetween. I have overcome this difficulty by utilizing a conventional electron discharge device and feeding the grid circuit thereof with an alternating potential which is preferably maintained constant. A circuit arrangement is provided whereby the grid bias on this electron discharge device is made to vary with variations in the energizing current so that the alternating output potential of the discharge device is also made to vary with variations in the energizing current, preferably lineally therewith. A rectifier is placed in circuit with the output of the electron discharge device and an electric circuit is connected to the output of the rectifier and to the potential electrodes in such manner that two opposing potential differences are produced in the circuit. One of these opposing potential differences is the potential created between the potential electrodes by the energizing current and the other potential difference comes from the output of the rectifier and varies with the grid bias on the electron discharge device. Means is provided for adjusting the value of one of these potential differences. Such means is preferably calibrated directly in terms of the ratio between the energizing current and the created potential, and may comprise means for independently varying the bias on the electron discharge device. Means such as an indicating galvanometer is provided in the potential electrode circuit for indicating when the opposing potential differences are equal to one another.

A source of unidirectional energizing current such as a controllable shunt generator 51 (Fig. 8) is shown connected in circuit with conductors 52a and 53a which may be connected to energizing electrodes I₁ and I₂ as shown in Fig. 1, for example. A voltage-dropping resistor 53 is shown connected serially in circuit with the conductor 52a so that the voltage across the resistor will vary with changes in magnitude of the energizing current. An electron discharge device 54 is shown as comprising a control grid 55, a plate 56, and a cathode 57. A source of alternating current 58, preferably providing a constant voltage and of any desired and conveniently obtainable frequency, for example 1,000 cycles, is shown connected serially in circuit with a blocking condenser 59, input resistor 60, resistor 61, and conductor 62.

The grid cathode or input circuit of the discharge device 54 is shown as comprising input resistor 60 and grid biasing resistor 63, receiving its bias from the energizing circuit as will be more fully described hereinafter, both connected in series between the grid 55 and the cathode 57. The plate cathode or output circuit of the discharge device is shown as comprising a source of plate potential 64 connected through one winding of isolating transformer 65 to the plate 56, and the other side of the source of potential is shown connected through voltage drops 66 and 67 to the cathode 57. Suitable means, not shown, may be provided for heating the filament 68 of the discharge device.

With the arrangement shown, the alternating potential supplied by the source 58 is fed to grid 55 and produces an alternating voltage in secondary winding 65b of transformer 65. This alternating voltage in the winding 65b may be varied by varying the grid bias on the discharge device 54. Since this bias is supplied in part by the voltage drop produced by the flow of energizing current through the voltage dropping resistor 53, it is evident that the changes in the energizing current flowing through the resistor 53 may be made to produce corresponding changes in the alternating output voltage received across the winding 65b. A rectifier 66 is connected across the winding 65b to rectify the alternating potential produced in said winding, and the output of the rectifier is connected to an electric circuit which may be connected between the potential electrodes in such manner that two opposing potential differences are produced in this circuit. One of these potential differences comprises the potential difference existing between the potential electrodes, and the other potential difference comprises the rectified potential supplied by the rectifier 66. The electric circuit is shown as comprising a conventional galvanometer 67 for indicating when the opposing potential differences are equal to one another, and a load resistor 68 connected in shunt with the rectifier 66. A series resistor 69 is also provided for limiting the current through the galvanometer 67 when there is a considerable difference in magnitude between the two opposing potential differences. A key 70 is shown for shunting out this resistance when the two opposing potential differences are more nearly equal.

For any given set of circuit constants and for a given electrode configuration, a given energizing current will create a given potential if the survey is being conducted through a homogeneous medium. For mediums other than homogeneous the created potential will be either more or less than this given value. Thus, it becomes necessary in order to obtain a null reading on galvanometer 67 to adjust the value of one of these opposing potential differences to make them equal to one another. The magnitude of this adjustment may be used as a measure of the change in the ratio between the energizing current and the created potential. I may conveniently provide this adjustment by connecting the control grid 55 to the voltage dropping resistor 53 through a sliding tap 69, so that I may vary the value of one of the opposing potential differences by changing the position of the tap 69. By proper design the positions of the tap 69 may be calibrated to read directly in terms of the ratio between the energizing current and the created potential when the two opposing potential differences are equal to one another.

Although the above circuit was described as though the electron discharge device 54 was a conventional triode with three electrode elements, I prefer to use discharge devices with more than three electrode elements, since somewhat more uniform and straight-line characteristics may be obtained. Thus, I have illustrated a discharge device with five grids, commonly known as a pentagrid mixer, provided with suppressor grid 70 directly connected to the cathode 57 and screen grids 71 supplied with a positive potential from a voltage divider 92 connected across the plate potential source 64. A second control, or, as more commonly known, a gain control grid, 72, is shown connected between biasing resistors 66 and 67 so as to be more negative than the cathode 57. By proper proportioning of the resistors 66 and 67 so as to give from −5.0 to −0.2 volts on the gain control grid and from −2.0 to −7.0 volts on the control grid, when using from 75 to 100 volts on the screen grid and from 150 to 200 volts on the plate, all with respect to the cathode when using a conventional pentagrid mixer such as an RCA type 1612, the change in voltage across the transformer winding 65b will be substantially lineal with respect to the changes in current through the resistor 53.

Obviously, the methods and apparatus of my invention are subject to wide modification; hence I do not choose to be limited to the examples described and illustrated above, but rather to the scope of the appended claims.

I claim:

1. In a method of electrical exploration of the subsurface, the steps which comprise: conducting a survey to determine variations in the subsurface at different depths by passing an electric current through the earth between one electrode connected to the earth at a substantially fixed position and another electrode spaced from said one electrode, moving said other electrode to a plurality of different positions along an interval of distance on the earth's surface, and taking a series of measurements which are indicative of variations in a quantity created at a fixed position on the earth's surface by the flow of said current through the earth as said other electrode is moved to said different positions; and conducting another such survey by passing an electric current through the earth between one electrode connected to the earth at a substantially fixed position different from the fixed position of the one electrode in the first-mentioned survey and another electrode spaced from the second-mentioned one electrode, moving the second-mentioned other electrode to a plurality of different positions along an interval of distance on the earth's surface partially overlapping and partially extending beyond one end of the interval along which the first-mentioned other electrode was moved in the first survey, and taking a series of measurements which are indicative of variations in a quantity created at a fixed position on the earth's surface by the flow of said current through the earth as the second-mentioned other electrode is moved to said different positions, a plurality of said measurements of the second survey being taken when the second-mentioned other electrode is located at the same positions at which the first-mentioned other electrode was located while taking a plurality of the measurements of the first survey.

2. A method in accordance with claim 1, in which the position on the earth's surface at which the created quantity involved in the measurements is obtained, is different in the two surveys.

3. A method in accordance with claim 1, in which the spacing between the position at which the created quantity involved in the measurements is obtained and the fixed electrode in each survey is the same for each survey.

4. A method in accordance with claim 1, in which the position at which the created quantity involved in the measurements is obtained is in each survey located between the electrodes used in that survey.

5. A method of electrical exploration of the subsurface, which comprises: conducting a first survey by moving an energizing electrode to a plurality of different positions over a first interval of distance along a straight line on the earth's surface while maintaining another energizing electrode in a fixed location on said line so as to vary the separation between said electrodes and passing electric current between said electrodes so as to cause the current to flow through paths of different depths and create successive values of a quantity at a fixed position on the earth's surface, and taking a series of measurements, while said current is flowing through the successive paths, indicative of the effect of variations in the subsurface upon the value of said created quantity at said fixed position as the path of current is so varied; and conducting a second survey by moving an energizing electrode to a plurality of different positions over a second interval of distance along said line overlapping said first interval in such manner that part of the positions in said two intervals are the same, while maintaining another energizing electrode in a fixed location on said line spaced from said first-mentioned locations so as to vary the spacing between said last-named electrodes and passing electric current between said last-named electrodes so as to cause the current to flow through paths of different depths and create successive values of said quantity at a fixed position, and taking a second series of measurements, while said current is flowing through the successive paths last-mentioned and when the first one of said last-mentioned electrodes is at some of said positions in said overlapping interval, indicative of the effect of variations in the subsurface upon the value of said created quantity at said last-named fixed position as the path of current is so varied.

6. A method as set forth in claim 5, in which the fixed position used in each survey is located on said line.

7. In a method of electrical exploration of the subsurface, the steps which comprise: conducting a survey to determine variations in the subsurface at different depths by passing a controlled electric current through the earth between one electrode connected to the earth at a substantially fixed position and another electrode spaced from said one electrode, moving said other electrode to a plurality of different positions along an interval of distance on the earth's surface, and taking a series of measurements involving variations in the potential difference created between potential electrodes connected to the earth at fixed locations by the flow of said current through the earth as said other electrode is moved to said different positions; and conducting another such survey by passing a controlled electric current through the earth between one electrode connected to the earth at a substantially fixed position different from the fixed position of the one electrode in the first-mentioned survey and another electrode spaced from the second-mentioned one electrode, moving the second-mentioned other electrode to a plurality of different positions along an interval of distance on the earth's surface partially overlapping and partially extending beyond one end of the interval along which the first-mentioned other electrode was moved in the first survey, and taking a series of measurements involving variations in the potential difference created between potential electrodes connected to the earth at fixed locations by the flow of said current through the earth as the second-mentioned other electrode is moved to said different positions, a plurality of said measurements of the second survey being taken when the second-mentioned other electrode is located at the same positions at which the first-mentioned other electrode was located while taking a plurality of the measurements of the first survey.

8. A method as set forth in claim 7, in which the positions of said potential electrodes are different in the two surveys.

9. A method as set forth in claim 7, in which all of said electrodes are located substantially on the same straight line.

10. In a method of electrical exploration of the subsurface, the steps which comprise: conducting a survey to determine variations in the subsurface at different depths by passing a controlled electric current substantially continuously through the earth between one electrode connected to the earth at a substantially fixed position and another electrode spaced from said one electrode, moving said other electrode to a plurality of different positions along an interval of distance on the earth's surface while maintaining said other electrode in substantially continuous electrical contact with the earth's surface, and substantially continuously taking measurements which are indicative of variations in a quantity created at a fixed position on the earth's surface by the flow of said current through the earth as said other electrode is moved to said different positions; and conducting another such survey by passing a controlled electric current substantially continuously through the earth between one electrode connected to the earth at a substantially fixed position different from the fixed position of the one electrode in the first-mentioned survey and another electrode spaced from the second-mentioned one electrode, moving the second-mentioned other electrode to a plurality of different positions along an interval of distance on the earth's surface partially overlapping and partially extending beyond one end of the interval along which the first-mentioned other electrode was moved in the first survey, while maintaining said second-mentioned other electrode in substantially continuous electrical contact with the earth's surface, and substantially continuously taking measurements which are indicative of variations in a quantity created at a fixed position on the earth's surface by the flow of said current through the earth as the second-mentioned other electrode is moved to said different positions.

11. A method as set forth in claim 10, in which said electrodes are all located substantially on the same straight line.

12. In apparatus for measuring the ratio between the electric current in an energizing circuit and the potential difference between two electrodes, the combination which comprises: an electron discharge device having grid, cathode and plate elements; a source of alternating potential connected between said grid and cathode; a voltage dropping resistor in series in said energizing circuit and connected in circuit with said grid and cathode whereby the grid bias on said discharge device changes with changes in energizing current; a rectifier in circuit with said plate and cathode for rectifying the alternating potential received from said discharge device; an electric circuit connected to the output of said rectifier and to said potential electrodes in such manner that two opposing potential differences are produced in said circuit; calibrated means for adjusting the value of one of said potential differences; and means included in said circuit for indicating when said opposing potential differences are equal to one another.

13. An apparatus as set forth in claim 12, in which said discharge device comprises a plurality of grid elements and the potentials between the elements in said discharge device are such that the change in rectified output is substantially linear with respect to the change in said energizing current.

JOHN JAY JAKOSKY.